United States Patent [19]

Wittenberg

[11] Patent Number: 4,926,185
[45] Date of Patent: May 15, 1990

[54] MULTIPLE RADIO FREQUENCY SINGLE RECEIVER RADAR OPERATION

[75] Inventor: Peter Wittenberg, Torrance, Calif.

[73] Assignee: Hughes Aircraft Company, Los Angeles, Calif.

[21] Appl. No.: 262,917

[22] Filed: Oct. 26, 1988

[51] Int. Cl.[5] .............................................. G01S 7/28
[52] U.S. Cl. ..................................... 342/201; 342/202
[58] Field of Search ................. 342/131, 201, 134, 202

[56] References Cited

U.S. PATENT DOCUMENTS

| | | | |
|---|---|---|---|
| 2,817,832 | 12/1957 | Mathes | 342/131 |
| 3,390,391 | 6/1968 | Kissinger et al. | 342/131 |
| 3,566,408 | 2/1971 | Pedersen | 342/201 |
| 4,197,540 | 4/1980 | Riggs et al. | 342/201 |
| 4,562,438 | 12/1985 | Rouse et al. | 342/201 |

FOREIGN PATENT DOCUMENTS 170774  9/1985  Japan .

OTHER PUBLICATIONS

Skolnik, "Introduction to Radar Systems", McGraw Hill, 1980, Chapter 4.

Primary Examiner—Thomas H. Tarcza
Assistant Examiner—Mark Hellner
Attorney, Agent, or Firm—Leonard A. Alkov; W. K. Denson-Low

[57] ABSTRACT

A pulse radar system including an RF exciter for generating a repeating sequence of internal pulses of RF energy of different frequencies. A transmit circuit responsive to the internal pulses of RF energy generates a transmit radar signal comprising a transmit repeating sequence of transmit intervals during which pulses of RF energy are transmitted. A single receiver responsive to the repeating sequence of internal RF pulses receives radar return signals based on all of the RF frequencies in a receive repeating sequence of receive intervals which do not occur at the same time as said transmit intervals.

15 Claims, 2 Drawing Sheets

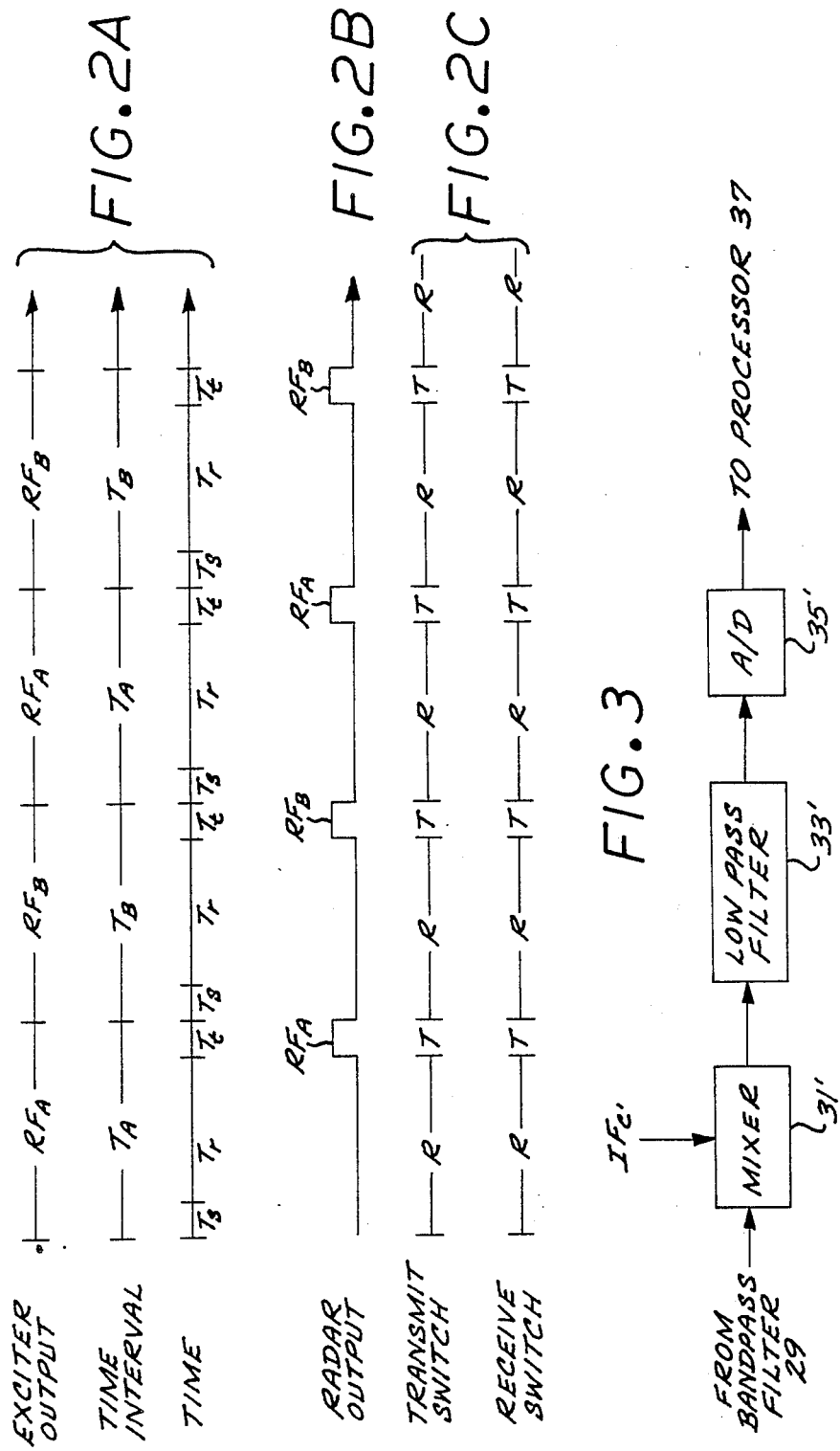

MULTIPLE RADIO FREQUENCY SINGLE RECEIVER RADAR OPERATION

BACKGROUND OF THE INVENTION

The disclosed invention generally relates to a pulse radar system, and is more particularly directed to a pulse radar system that utilizes a plurality of RF frequencies with a single receiver.

In a typical pulse radar system, the transmitted signal comprises a pulse modulated radio frequency (RF) carrier signal. The pulse repetition frequency (PRF) will depend primarily on the maximum range at which targets are expected since for a given pulse emitted, any corresponding return signal should be received during the receive interval prior to the next pulse in order to avoid ambiguities. In other words, if the pulse repetition rate is too high, the likelihood of receiving target echoes from the wrong pulse transmission (multiple-time-around echoes) is increased.

Thus, unless ambiguous ranges are acceptable, or unless techniques are utilized to distinguish multiple-time-around echoes, which pose other problems, pulse repetition frequencies are reduced with increasing maximum expected range. For applications where the range of interest is further away, for example greater than 40 nautical miles, low pulse repetition rates are utilized and only a small portion of the receive interval is useful. The remaining portion of the receive interval is waiting time that is not utilized.

A known technique for utilizing otherwise non-useful waiting time of the receive interval utilizes a plurality of respectively associated receivers and fixed frequency RF exciters (i.e., each receiver is responsive only to a specific fixed frequency exciter) to permit simultaneous transmit and receive of different frequencies. Performance is improved, but at the cost of additional hardware and complexity.

Performance can also be improved by increasing transmission power. However, this requires larger power supplies, increased power handling capabilities, and in certain applications produces an unwanted increase in interception.

SUMMARY OF THE INVENTION

It would therefore be an advantage to provide a pulse radar system which utilizes a portion of the receive interval to improve performance with a single receiver.

It would be a particular advantage to provide a pulse radar system which interleaves pulse trains of different RF frequencies with a single receiver.

Another advantage would be to provide a pulse radar system which provides increased signal to noise ratio without increasing transmission power.

The foregoing and other advantages are provided in a radar system that includes a circuit for generating a repeating sequence of internal pulses of RF energy of different frequencies. A transmit circuit responsive to the internal pulses of RF energy generates a transmit radar signal comprising a transmit repeating sequence of transmit intervals during which pulses of RF energy are transmitted. A single receiver responsive to the repeating sequence of internal RF pulses receives radar return signals based on all of the RF frequencies in a receive repeating sequence of receive intervals which do not occur at the same time as the transmit intervals.

BRIEF DESCRIPTION OF THE DRAWING

The advantages and features of the disclosed invention will readily be appreciated by persons skilled in the art from the following detailed description when read in conjunction with the drawing wherein:

FIG. 2A-2C are timeline diagrams illustrating the transmit and receive timing for the different RF frequencies of the radar system of FIG. 1.

FIG. 3 is a block diagram of further circuitry that is utilized with the system of FIG. 1 to provide coherent receiver processing.

DETAILED DESCRIPTION

Figure 1:
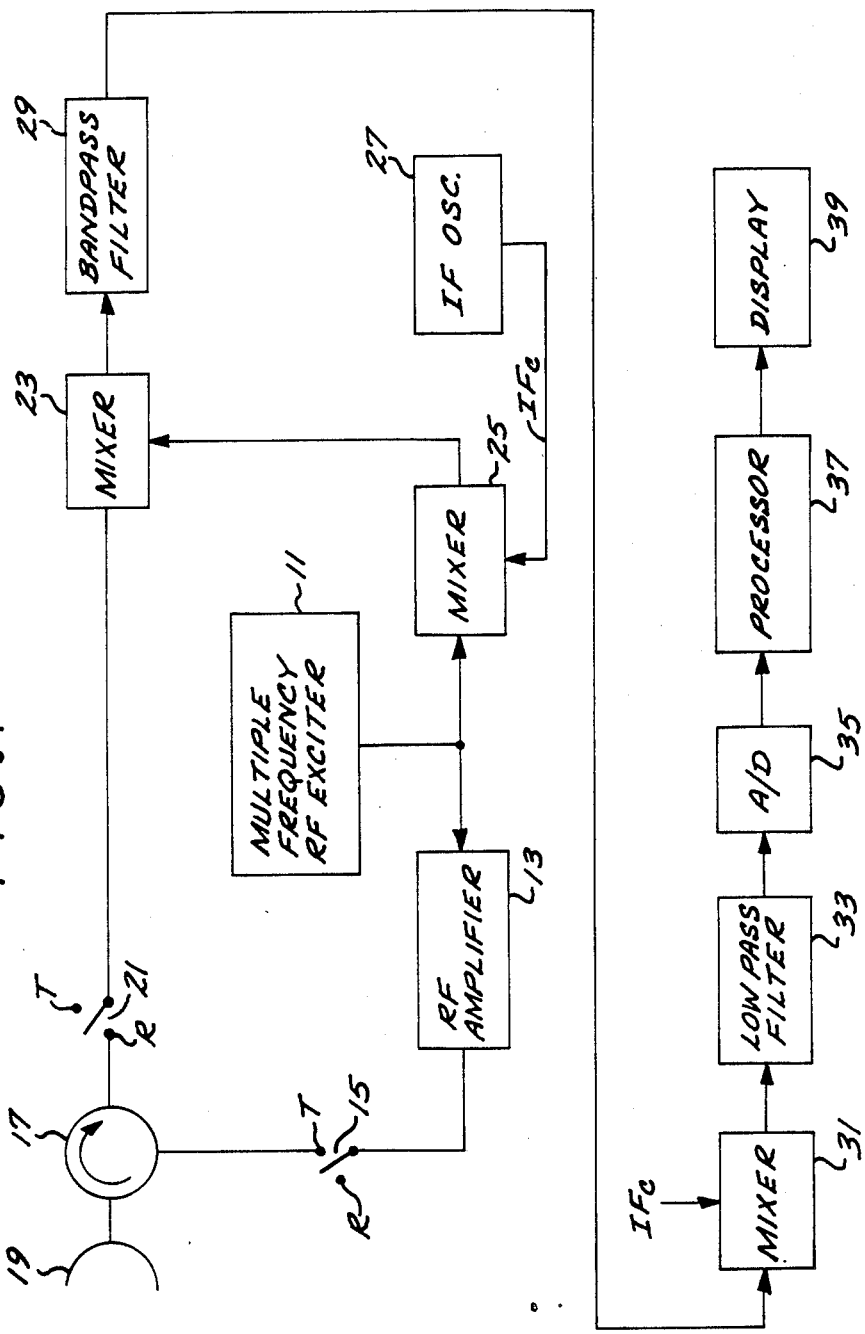
FIG. 1 is a block diagram of a pulse radar system in accordance with the invention.

In the following detailed description and in the several figures of the drawing, like elements are identified with like reference numerals.

Referring now to FIG. 1, shown therein is a block diagram of a pulse radar system 10 having a multiple frequency RF exciter 11 which provides an RF output that is switched between different frequencies. The output of the multiple frequency RF exciter 11, which will be described more fully herein, is provided to an RF transmit amplifier 13. The output of the transmit amplifier 13 is coupled to a circulator 17 via a transmit switch 15. The circulator 17 is a known circuit which includes an antenna port and a receive port in addition to the transmit port. It directs signals on the transmit port to an antenna 19 coupled to the antenna port, and directs signals received by the antenna to the receiver port.

The receive port of the circulator 17 is coupled to one input of a mixer 23 via a receive switch 21. The other input of the mixer 23 receives the output of a mixer 25. The inputs to the mixer 25 are provided by the RF exciter 11 and an IF oscillator 27 which provides the intermediate frequency (IF) carrier signal $IF_c$.

It is well known in the art that the circulator 17 does not provide sufficient isolation and protection of the radar receiver circuitry (i.e., the circuitry downstream of the receive switch 21) from the transmit signal to the transmit port of the circulator 17. Thus, although not shown to avoid the complexity of unnecessary details, additional receiver protection circuitry of known configuration would be utilized in the implementation of the radar system 10. Typically, the receive switch 21 would be incorporated in that receiver protection circuitry.

In operation, the transmit switch 15 is closed for transmission and is otherwise open. The receive switch 21 is closed when the transmit switch 15 is open. For ease of reference, the transmit switch 15 is in position T (for transmit) when it is closed, and is in position R (for receive) when it is open. By the same reasoning, the receive switch 21 is in the position R when it is closed, and in the position T when it is open. The switches 15, 21 comprise very fast switches as are utilized in present radar systems, and for practical purposes, one of the switches is closed at any given point in time.

The output of the mixer 23 is connected to a bandpass filter 29 which provides its output to one input of a mixer 31. The other input of the mixer 31 receives the IF carrier signal $IF_c$ provided by the IF oscillator 27. The output of the mixer 31 is provided to a low pass filter 33 whose output is coupled to the input of an analog-to-digital (A/D) converter 35 which provides digital samples of the received radar signals. A processor 37, which can be microprocessor based, processes the digital samples and provides the processed outputs to a display apparatus 39 which can be a video display or a plotter, for example.

The foregoing radar system 10 departs from known systems in the use of multiple RF frequencies and the single receiver processing of the received radar signals. Referring specifically to FIG. 2A, shown therein is a timing diagram showing, by way of illustrative example, the use of two (2) RF frequencies denominated $RF_A$ and $RF_B$ which are alternately provided by the RF exciter 11 for respective time intervals, which can be equal or unequal. Thus, for example, the first RF frequency $RF_A$ is provided during the time interval $T_A$, while the second RF frequency $RF_B$ is provided during the time interval $T_B$. Essentially, the RF exciter provides a repeating sequence of pulses of two different RF frequencies.

As shown in FIG. 2A, each of the time intervals $T_A$, $T_B$ is allocated into sequential subintervals respectively identified as settling time $T_s$, receive time $T_r$, and transmit time $T_t$. Taking specifically the time interval $T_A$, the settling time $T_s$ occurs after the RF exciter switches to the frequency $RF_A$ and defines the time when the output of the RF exciter settles to the new RF frequency. The receive time $T_r$ follows and defines the time when return echoes can be received from the transmission which occurred during the prior time interval $T_A$. The transmit time $T_t$ defines the time when the radar system is transmitting a pulse of the frequency $RF_A$.

The receive switch 21 is closed during the settling time and receive time subintervals, and is open during the transmit time subinterval. The transmit switch 15 is open during the settling and receive subintervals, and is closed during the transmit subinterval.

The operation during the time interval $T_B$ is substantially identical except that the output of the exciter circuit 11 is the frequency $RF_B$.

FIG. 2B schematically illustrates the transmitted output of the radar system 10 which includes alternating pulses of RF energy of the two frequencies $RF_A$ and $RF_B$. The transmitted output can be considered as the interleaving of two pulse trains having the same periodicity, wherein each pulse train comprises pulses of RF energy of one of the RF frequencies. Essentially, the radar system 10 transmits a pulse of a given RF frequency while waiting for the return signal from the prior pulse of a different RF frequency.

FIG. 2C shows the positions of the transmit switch 15 and the receive switch 21 for given subintervals of the time intervals $T_A$ and $T_B$. It should be recalled that the T and R positions of the transmit and receive switches are reversed as between them. Thus, position R for the transmit switch means that it is open while position R for the receive switch means that it is closed.

For ease of understanding of the processing of the digitized radar data, it should be recalled that signals received during the receive interval $T_r$ of a given time interval associated with a given frequency (for example $T_A$ for the frequency $RF_A$) are the result of the pulse of RF energy that was transmitted during the immediately prior time interval for that frequency ($T_A$ in this example). Since the time relation between a given receive subinterval and its corresponding transmitted pulse is fixed, each output of the A/D converter 35 has a known time delay associated with it. Since range bins are based on time delay, each output of the A/D converter 35 has a known range bin associated therewith and each output of the A/D converter 35 has a particular RF frequency associated with it. Known circuitry, including resettable counters for example, in the processor 37 is utilized to associate the received signal sample with the appropriate RF frequencies and range bins.

For non-coherent processing, the processor 37 receives the received signal samples and associates the received samples with the appropriate range bins without regard for RF frequency. In other words, only time delay is recognized. For each range bin, a predetermined number of received signal samples is integrated, and the integration result is provided to the display apparatus 39.

Alternatively, the received signal samples provided by the A/D converter 35 can be stored in different memories respectively associated with the different frequencies, and then integrated separately for a given integration period. The integrated data for each range bin (one for each RF frequency) are added to provide a combined output.

If the processing provided is coherent processing, there are further considerations. First, the RF exciter 11 must provide for each frequency coherence between the intervals associated with such frequency. In other words, when the output of the RF exciter 11 switches for example from $RF_B$ to $RF_A$ and then to $RF_B$, the waveform of the later occurring $RF_B$ must be of the same phase that would have occurred if the switch to $RF_A$ had not occurred. The output intervals for $RF_A$ must also have the same phase relations. Generally stated, for each RF frequency, the phase of the output of the RF exciter 11 must be predictable.

The necessary coherence can be achieved with known phase-locked loop techniques. For example, the RF exciter 11 can comprise a phase locked loop that includes a free running reference oscillator that can be switched from one harmonic to another without switching to a different crystal. In other words, within the reference oscillator each harmonic behaves as if it were not interrupted.

Further as to coherent processing in-phase and quadrature components must be determined. For example, referring specifically to FIG. 3, a mixer 31', a low pass filter 33', and an A/D converter 35 would be connected in parallel with the mixer 31, low pass filter 33, and A/D converter 35 of FIG. 1. The output of the bandpass filter 29 is provided to one of the inputs of the mixer 31' which at its other input receives an IF carrier signal $IF_{c'}$ which is a version of the IF carrier signal $IF_c$ (provided to the mixer 31) that is 90 degrees out of phase relative thereto. The A/D converter 35' provides the quadrature components while the A/D converter 35 provides the in-phase components.

For coherent processing, the processor 37 can integrate the received signal samples for each RF frequency separately for each range bin. That is, the in-phase and quadrature components for each frequency for each range bin are integrated separately. The respective integrated data (in-phase and quadrature) for each frequency for each range bin are then added to provide a combined output for each range bin. Magnitude is then calculated from the in-phase and quadrature components for each range bin or range-bit doppler cell (for coherent processing), which is provided to the display 39.

Alternatively, the in-phase and quadrature components of each received signal sample can be utilized to obtain the magnitude of such sample which is then processed non-coherently as discussed above.

The above-described processing is based on known single frequency processing techniques. Essentially, known processing techniques are utilized with the modification, to the extent necessary, that the received radar data for the different RF frequencies be separated and processed separately.

It should be appreciated that although the foregoing illustrative example utilizes two RF frequencies, the disclosed invention contemplates multiple RF frequencies in a predetermined sequence that is continually repeated. Thus, for example, the RF exciter could provide a repeating sequence of pulses of three (3) RF frequencies $RF_A$, $RF_B$, $RF_C$ during three sequential time intervals $T_A$, $T_B$, $T_C$, which can be of equal or unequal duration. Each interval would have settling time, receive, and transmit intervals as described above. Like the two RF frequency example, the transmitted output of the N frequency radar can be considered as the interleaving of N pulse trains of the same periodicity wherein each pulse train includes pulses of RF energy of one of the RF frequencies.

The invention more generally contemplates multiple RF frequencies wherein the receive and transmit intervals for a given frequency do not have to be adjacent. Thus, the invention generally contemplates a repeating sequence of interleaved receive and transmit interval pairs for each of a plurality of different frequencies, where the receive and transmit interval pair for a given RF frequency do not have to be adjacent. The above described two and three frequency radars are examples of adjacent transmit and receive interval pairs for each frequency. For a multiple RF radar utilizing three (3) RF frequencies $RF_A$, $RF_B$, $RF_C$ and non-adjacent receive and transmit intervals for a given frequency, the transmit and receive repeating sequence could be:

Receive $RF_A$
Transmit $RF_B$
Receive $RF_C$
Transmit $RF_A$
Receive $RF_B$
Transmit $RF_C$ In this example, the intervals during which a given RF frequency is provided by the RF exciter is controlled so as to provide the appropriate RF frequency for an appropriate time interval. Thus, during a transmit interval, the RF exciter would provide a given RF frequency output for only a short time as needed for settling time and transmit time. The receive intervals would be longer.

Essentially, the disclosed radar system provides for a repeating sequence of internal RF pulses provided by the RF exciter, a transmit repeating sequence and a receive repeating sequence. Thus, for the example discussed above of a three (3) RF frequency radar with non-adjacent receive and transmit intervals for each RF frequency, the repeating sequence of RF pulses provided by the exciter is ($RF_A$, $RF_B$, $RF_C$, $RF_A$, $RF_B$, $RF_C$). The transmit interval repeating sequence in terms of RF frequency is ($RF_B$, $RF_A$, $RF_C$) and the receive interval repeating sequence in terms of RF frequency is ($RF_A$, $RF_C$, $RF_B$). Transmit and receive intervals do not occur at the same time, and interleaving of the transmit and receive interval sequences defines the repeating sequence of RF pulses provided by the RF exciter.

For the example discussed earlier of a three (3) RF frequency radar with adjacent receive and transmit intervals for each RF frequency, the repeating sequence of RF pulses provided by the RF exciter is ($RF_A$, $RF_B$, $RF_C$), where each pulse of a given frequency is utilized for one receive interval and one transmit interval for that frequency. The transmit interval repeating sequence is ($RF_A$, $RF_B$, $RF_C$) and the receive interval repeating sequence is ($RF_A$, $RF_B$, $RF_C$). Transmit and receive intervals do not occur at the same time, and interleaving the transmit and receive interval sequences produces the sequence ($RF_A$, $RF_A$, $RF_B$, $RF_B$, $RF_C$, $RF_C$), which defines the repeating sequence of RF pulses ($RF_A$, $RF_B$, $RF_C$) provided by the RF exciter since each RF pulse of the exciter is used for a receive interval and a transmit interval. In other words, rather than providing two adjacent pulses of RF energy at the same frequency, the RF exciter provides one pulse of RF energy for each occurrence of adjacent receive and transmit intervals of a given frequency.

The foregoing has been a disclosure of a pulse radar system having multiple RF frequencies and a single receiver, and wherein only one internal RF frequency is present in the system at any given time. The use of multiple frequencies provides for increased signal-to-noise ratio, which allows for longer detection ranges and/or increased visibility of targets as compared to a single frequency radar at the same peak transmit power. Conversely, with the radar system of the invention, the same signal-to-noise ratio is achieved at a lesser peak transmit power as compared to a single frequency radar. Further, multiple RF frequencies reduce speckle, which is particularly advantageous for synthetic aperture radar. The reduced peak transmit power reduces the probability of interception, which is advantageous in certain military applications, as is the improved performance against electronic countermeasures resulting from the use of multiple frequencies.

It should be appreciated, however, that the foregoing advantages are achieved at the sacrifice of not being able to use some of the range bins, the lower limit of which would be determined by the settling time of the RF exciter 11. It should also be appreciated that the multiple frequency radar of the invention cannot be used for high pulse repetition frequencies, for example, above 100 KHz, but such systems already have higher signal-to-noise ratios in comparison to low pulse repetition frequency radar by virtue of higher duty factors and shorter ranges. This invention will, however, somewhat reduce the need to go to a higher pulse repetition rate by providing a higher duty factor with a lower pulse repetition rate.

Although the foregoing has been a description and illustration of specific embodiments of the invention, various modifications and changes thereto can be made by persons skilled in the art without departing from the scope and spirit of the invention as defined by the following claims.

What is claimed is:

1. A pulse radar system comprising:
    single RF generating means having a multiple frequency RF signal exciter for generating an internal RF repeating sequence of internal pulses of RF energy of different frequencies at different times;
    means responsive to said internal repeating sequence of pulses of RF energy for generating a transmit radar signal comprising a transmit repeating sequence of transmit intervals during which pulses of RF energy are transmitted; and means responsive to said internal RF repeating sequence of pulses for receiving radar return signals based on all of said RF frequencies of said transmit radar signal in a single receive port in a receive repeating sequence of receive intervals which do not occur at the same time as said transmit intervals.

2. The pulse radar system of claim 1 wherein a transmit interval for a given frequency is not adjacent a receive interval for such frequency.

3. The pulse radar system of claim 1 wherein a transmit interval for a given frequency is adjacent a receive interval for such frequency.

4. The pulse radar system of claim 1 wherein said RF generating means comprises means for providing a single RF output comprising said internal RF repeating sequence of internal pulses of RF energy of different frequencies.

5. The pulse radar system of claim 4 wherein said RF generating means maintains coherence between the occurrences of each different RF frequency in said sequence.

6. A pulse radar system comprising:
single RF generating means having a multiple frequency RF signal exciter for generating an internal RF repeating sequence of internal pulses of RF energy of different frequencies at different times;
means responsive to said internal repeating sequence of pulses of RF energy for generating a transmit radar signal comprising a transmit repeating sequence of transmitted pulses of RF energy, said transmitted pulses being narrower than said internal pulses and said transmit sequence corresponding to said internal RF repeating sequence; and
means responsive to said internal RF repeating sequence of pulses for receiving radar return signal based on all of said RF frequencies of said transmit radar signal in a single receive port in a receive repeating sequence corresponding to said internal RF repeating sequence.

7. The pulse radar system of claim 6 wherein said internal RF sequence of pulses comprises pulses of constant interval.

8. The pulse radar system of claim 6 wherein said internal RF sequence of pulses includes a pulse of a first RF frequency and a pulse of a second RF frequency.

9. The pulse radar system of claim 6 wherein said RF generating means comprises means for providing a single RF output comprising said internal RF repeating sequence of internal pulses of RF energy of different frequencies.

10. The pulse radar system of claim 9 wherein said RF generating means maintains coherence between the occurrences of each different RF frequency in said sequence.

11. The pulse radar system of claim 6 wherein each of said internal pulses of RF energy includes receive and transmit subintervals, and wherein:
said transmit generating means includes means for coupling said internal RF pulses to said transmit generating means during said transmit subintervals; and
said receiving means includes means for coupling said internal RF pulses to said receiving means during said receive subintervals.

12. A pulse radar system comprising:
single RF generating means having a multiple frequency RF signal exciter for generating a single internal RF signal comprising an internal RF repeating sequence of pulses of RF energy of different frequencies at different times;
transmit means responsive to said internal repeating sequence of pulses of RF energy for generating a transmit radar signal comprising a transmit repeating sequence of transmitted pulses of RF energy, said transmitted pulses being narrower than said internal RF pulses and said transmit sequence corresponding to said internal RF repeating sequence; and
receive means responsive to said internal RF repeating sequence of pulse for receiving radar return signals based on all of said RF frequencies of said transmit radar signal in a single receive port in a receive repeating sequence corresponding to said internal RF repeating sequence.

13. The pulse radar system of claim 12 wherein said internal RF sequence of pulses comprises pulses of constant interval.

14. The pulse radar system of claim 12 wherein said internal RF sequence of pulses includes a pulse of a first RF frequency and a pulse of a second RF frequency.

15. The pulse radar system of claim 12 wherein said RF generating means maintains coherence between the occurrences of each different RF frequency in said sequence.

* * * * *